(No Model.)  2 Sheets—Sheet 1.
J. WHITE.
MULTICOLOR CHART.
No. 459,060.  Patented Sept. 8, 1891.
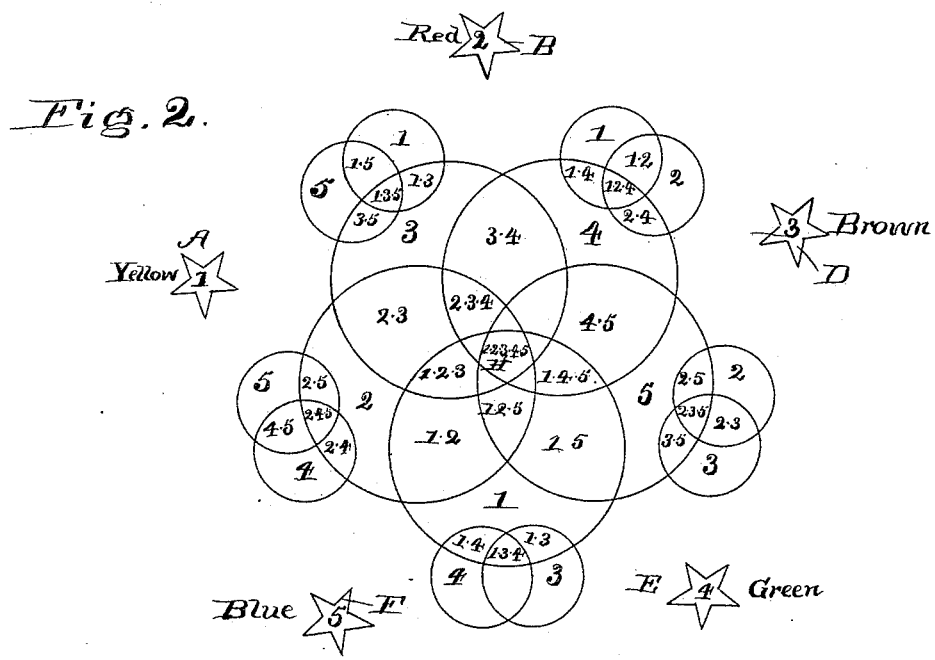
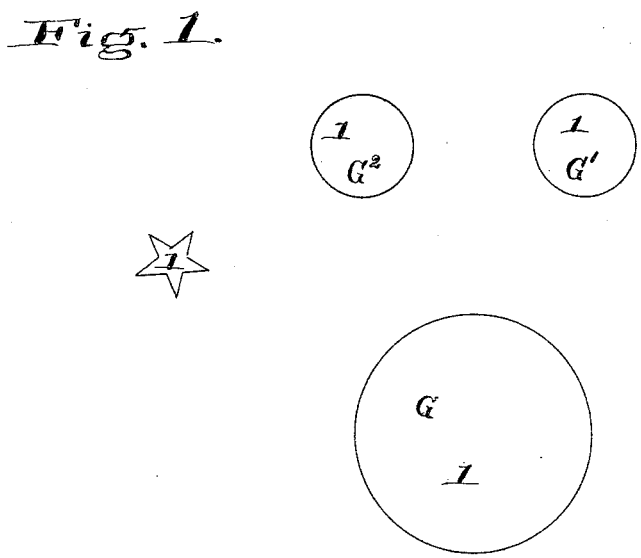
Witnesses:
John Russell Churchill
Flora L. Brown.
Inventor;
James White;
By Charles J. Brown,
Atty.

(No Model.) 2 Sheets—Sheet 2.
J. WHITE.
MULTICOLOR CHART.
No. 459,060. Patented Sept. 8, 1891.
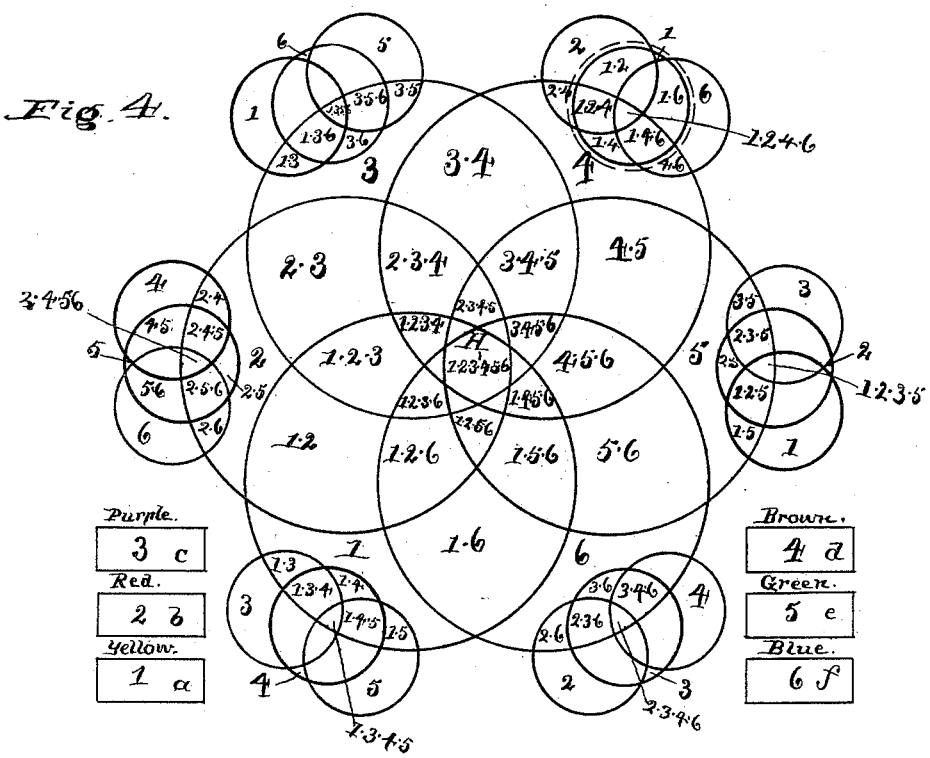
Fig. 4.
Fig. 3.
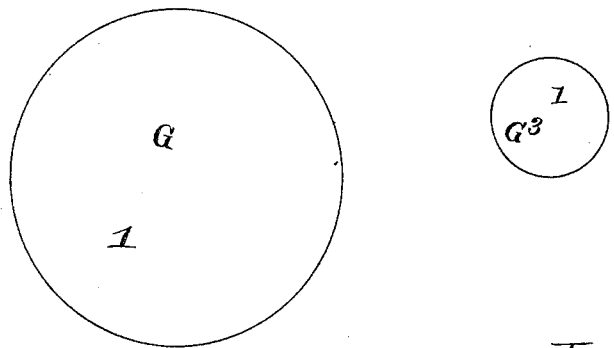
Witnesses:
John Russell Churchill.
Flora L. Brown.
Inventor:
James White,
By Charles J. Brown,
atty.

UNITED STATES PATENT OFFICE.

JAMES WHITE, OF CHICAGO, ILLINOIS.

MULTICOLOR CHART.

SPECIFICATION forming part of Letters Patent No. 459,060, dated September 8, 1891.

Application filed December 30, 1890. Serial No. 376,240. (No model.)

*To all whom it may concern:*

Be it known that I, JAMES WHITE, a citizen of the United States, residing at Chicago, in the county of Cook and State of Illinois, have invented certain new and useful Improvements in Multicolor Charts, of which the following is a specification.

My invention relates to that class of charts wherein masses of colors are grouped near to and imposed upon each other for the purpose of visually demonstrating the effect of contiguity and imposition of different colors.

The object of my invention is to obtain a chart by means of which printers and others engaged in any occupation wherein a color is placed in contact with another color or other colors upon a white or colored background, as paper, cloth, or other suitable material, or wherein a color is imposed upon a white or colored background and upon other colors, can determine by examination of the chart those colors which should not be imposed upon any given colored background or upon any given other color or colors, either because of the unpleasant results secured thereby or the uselessness of so placing any given color or colors.

A further object of my invention is to obtain a chart of the character described whereby those colors adapted to be placed on a background of the kind named of a given color or to be placed in contact with or imposed upon other colors upon a white or upon any given colored background may be readily determined by inspection of such chart; and the manner in which I accomplish the purposes of my invention is by imposing a series of three or more circles, diamonds, rectangles, or other geometrical forms of a given color grouped in a particular manner in relation to each other upon a white background and upon other series of three or more circles, diamonds, rectangles, or other geometrical forms grouped in the same manner in relation to each other as the first-named series and imposed upon the same background, and by imposing such several series of circles, diamonds, rectangles, or other geometrical forms upon several backgrounds, each of such backgrounds having a different color, and preferably the color of one of the series of colors imposed upon it or some shade thereof.

In order to more clearly describe my invention than could be otherwise done, I shall hereinafter omit all reference to any other geometrical forms than circles, as it will be readily understood by those skilled in the art that other geometrical forms can be substituted for the circles without departing from my invention.

In practical application of my invention it is necessary when a given series of circles of a particular color are imposed upon a white and a series of backgrounds of different color that the color of such circles shall be maintained uniform throughout the several series of backgrounds upon which they are placed, and the differently-colored backgrounds affecting the color or colors applied thereon so differently (intermingling wherewith and producing new shades and colors) that the eye is or is liable to be deceived thereby, other means than that afforded by the eye alone should be employed to place such series of circles upon the several differently-colored backgrounds.

In order to insure the uniformity of color required, I have heretofore placed the several series of circles upon such differently-colored background by printing them thereon with inks of different colors—that is to say, I have so far reduced my invention to practice by printing in a given color a series of properly-grouped circles upon white and colored papers, with other series grouped in like manner printed in other colors upon such white and colored papers and upon the series of circles already printed thereon.

In the drawings accompanying and forming a part of this specification I have illustrated in Figure 1 a series of three circles of a given color arranged in a prescribed way in relation to each other; Fig. 2, five of such series so arranged in relation to each and all of the other series that some circle or a part thereof of each series will be imposed upon or will have imposed upon it some circle or a part thereof of each and all of the other series— that is to say, assuming, as in Figs. 1 and 2, that the circles in series numbered 1 are yellow, 2 red, 3 brown, 4 green, and 5 blue, (such numbers indicated in addition to the color named the order in which I prefer to impose them upon white or colored paper,)

then some one circle or part thereof of the series of circles numbered 1 will have imposed thereon some one circle or a part thereof of each of the series numbered 2, 3, 4, and 5, and upon a background formed by the overlapping or superimposition of a part of some one circle or a part thereof of a lower numbered series there will be imposed some part of a circle of each and all of the series having a higher number than the highest one of the two forming such background. In Fig. 3 is illustrated a series of four circles arranged in a given manner in relation to each other. In this series of four circles three thereof may be of the same size and grouped around a larger circle, or one of the three smaller circles may be slightly larger than the other two thereof, as indicated by dotted lines in Fig. 3. Fig. 4 is a view of six series of circles imposed upon a background and partially upon each other, the circles in each of such series being arranged with reference to the other circles entering into the series in the same manner as are the series of circles illustrated in Fig. 3, the "form" consisting of a series of circles of a given color, being simply turned one-sixth around for each color and the color changed to obtain this view.

Like letters and figures refer to similar parts throughout the several views thereof.

The stars A, B, D, E, and F in Fig. 2 and the rectangles a, b, c, d, e, and f in Fig. 4 are designed to afford means whereby any one color imposed upon white or any colored background may be viewed independently from all other colors, such separation being effected by placing a paper over all the circles and the remaining stars or rectangles, thereby exposing to view the single color desired.

G is a large circle. G' G² G³ are smaller circles of the same color. Where stars, rectangles, or circles (one of each color) are arranged around the series of circles, as in Fig. 2, one of such stars, rectangles, or circles must enter into the form made by a series of circles, and a star properly placed to so enter into the form is illustrated in Fig. 3 and lettered 1.

As hereinbefore stated, the number given to the series of circles indicating in each case the order in which I prefer to impose such series upon the background thereof, and by inspection of Figs. 2 and 4 it will be seen that I have given a different color to series 3, 4, and 5, respectively, in Fig. 2 to that given them in Fig. 4. The order of imposing the several series may thus be changed at will without departing from the essential features of my invention, which are, briefly, the imposing upon a white and colored background of several series of circles, each series arranged in a determined manner with reference to the other series, and the several circles forming any one series being arranged in a determined manner with reference to the other circles entering into such series, the color given to any one series of circles upon one background being uniform throughout the several backgrounds upon which the series is imposed.

The results deemed by me important which can be obtained where five series of circles are imposed upon a white background and partially upon each other, as herein described, are indicated on Fig. 2 by the numbers thereon, and such results where six series of circles are imposed upon a white background and partially upon each other, as herein described, are indicated on Fig. 4 by the numbers thereon. Where the circles are imposed upon a colored background, such color will of course precede the colors indicated on Figs. 2 and 4. The combinations thus shown and indicated on Fig. 2 are—

| | | | |
|---|---|---|---|
| 1 2 | 1 2 3 | 1 2 3 4 | 1 2 3 4 5 |
| 1 3 | 1 2 4 | 1 2 3 5 | |
| 1 4 | 1 2 5 | 1 2 4 5 | |
| 1 5 | 1 3 4 | 1 3 4 5 | |
| 2 3 | 1 3 5 | 2 3 4 5 | |
| 2 4 | 1 4 5 | | |
| 2 5 | 2 3 4 | | |
| 3 4 | 2 3 5 | | |
| 3 5 | 2 4 5 | | |
| 4 5 | 3 4 5 | | | and those indicated on Fig. 4 are—

| | | |
|---|---|---|
| 1 2 | 1 2 3 | 1 3 5 6 |
| 2 3 | 2 3 4 | 1 2 4 6 |
| 3 4 | 3 4 5 | 1 2 3 5 |
| 4 5 | 4 5 6 | 2 3 4 6 |
| 5 6 | 1 5 6 | 1 3 4 5 |
| 1 6 | 1 2 6 | 2 4 5 6 |
| 2 4 | 1 2 4 | 1 2 3 4 |
| 4 6 | 1 4 6 | 2 3 4 5 |
| 3 5 | 2 3 5 | 3 4 5 6 |
| 1 4 | 1 2 5 | 1 4 5 6 |
| 2 5 | 3 4 6 | 1 2 5 6 |
| 1 5 | 2 3 6 | 1 2 3 6 |
| 3 6 | 1 4 5 | |
| 2 6 | 1 3 4 | |
| 1 3 | 2 5 6 | |
| | 2 4 5 | |
| | 1 3 6 | |
| | 3 5 6 | |

Some of the hereinabove-tabulated combination of colors are, it will be noted, repeated in the drawings, and other combinations of colors are to be found therein, as will more fully appear with reference to such drawings; but the principal object of my invention is attained in the combinations named in the tables in connection with those formed by the color of the background where other than a white background is used.

H is the center of the chart, around which center the several series of circles are concentrically arranged, so that the large circle entering into each series shall be imposed over such central point H. In this way all of the colors shown on the chart are imposed on the order indicated by the number of series on this common center H.

Having thus described my invention, what I claim, and desire to secure by Letters Patent of the United States, is—

1. In a multicolor chart, a series of circles consisting of a large circle and more than one small circle, in combination with more than three other like series of circles, all of a different color, the large circle of every series imposed upon a given center and all of such series arranged concentrically around a common center, whereby the first series of circles imposed upon the background has imposed thereon a portion of a circle of one and all of the remaining series, and each of the remaining series has imposed upon a portion of some one circle thereof a portion of a circle of each and all of the remaining series imposed upon the background, substantially as described.

2. In a multicolor chart, the combination of more than four series of circles imposed upon a white and series of colored backgrounds, the series of circles being alike, and each series consisting of a large circle and more than one small circle, each series of circles entering into and forming a part of the chart a different color from all the other series thereof, and the series so imposed upon a background that the large circle in every series is imposed on a common center around which such series are concentrically arranged, substantially as described.

3. In a multicolor chart, the combination of more than four series of circles imposed upon a series of different-color backgrounds, the series of circles being alike and arranged concentrically around a common center, each series consisting of a large and more than one small circle, each series being also of a different color than all the other series entering into the chart, the color-background entering into the chart as a part thereof and having at the common center of the chart all the colors of the series of circles imposed thereon, whereby there is obtained at any given part on the chart one more color than there are circles imposed on such background at such point, substantially as described.

4. In a multicolor chart, a series of geometrical forms consisting of a large one and more than one thereof of smaller size than the large one, in combination with more than three other like series of geometrical forms, all of a different color, the larger geometrical forms of every series imposed upon a given center, and all of such series arranged concentrically around a common center, whereby the first series of such geometrical forms imposed upon the background has imposed thereon a portion of one of the geometrical forms of one and all of the remaining series, and one of the remaining series has imposed upon a portion of some one geometrical form thereof a portion of a geometrical form of each and all of the remaining series imposed upon the background, substantially as described.

JAMES WHITE.

Witnesses:
CHARLES T. BROWN,
FLORA L. BROWN.